United States Patent
Edwards (10) Patent No.: US 11,236,605 B2
(45) Date of Patent: Feb. 1, 2022

(54) DOWNHOLE VALVE POSITION MONITOR

(71) Applicant: Jason Edwards, Broken Arrow, OK (US)

(72) Inventor: Jason Edwards, Broken Arrow, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 67 days.

(21) Appl. No.: 16/601,113

(22) Filed: Oct. 14, 2019

(65) Prior Publication Data

US 2021/0108508 A1 Apr. 15, 2021

(51) Int. Cl.
| | |
|---|---|
| *E21B 47/09* | (2012.01) |
| *E21B 34/06* | (2006.01) |
| *F16K 37/00* | (2006.01) |
| *G01D 5/50* | (2006.01) |
| *E21B 34/12* | (2006.01) |

(52) U.S. Cl.
CPC ............ *E21B 47/09* (2013.01); *E21B 34/066* (2013.01); *E21B 34/12* (2013.01); *F16K 37/0058* (2013.01); *G01D 5/50* (2013.01); *E21B 2200/05* (2020.05)

(58) Field of Classification Search
CPC ........ E21B 47/09; E21B 34/066; E21B 34/12; E21B 2200/05; F16K 37/0058; G01D 5/50
See application file for complete search history.

(56) References Cited

U.S. PATENT DOCUMENTS

| | | | | |
|---|---|---|---|---|
| 2005/0279496 | A1* | 12/2005 | Fontenot | E21B 34/06 166/250.1 |
| 2007/0170915 | A1* | 7/2007 | Gissler | E21B 47/09 324/207.24 |
| 2015/0134253 | A1* | 5/2015 | Ring | E21B 47/11 702/6 |
| 2015/0354316 | A1* | 12/2015 | Kirkpatrick | E21B 34/00 166/375 |
| 2016/0097258 | A1* | 4/2016 | Grubert | E21B 33/126 166/250.01 |
| 2017/0285219 | A1* | 10/2017 | Brady | G01V 5/101 |
| 2017/0335658 | A1* | 11/2017 | Williamson | F16K 15/033 |
| 2017/0362910 | A1* | 12/2017 | Stephens | E21B 47/13 |
| 2018/0051554 | A1* | 2/2018 | Werkheiser | E21B 47/09 |
| 2018/0275309 | A1* | 9/2018 | Berheide | G01V 5/101 |

* cited by examiner

*Primary Examiner* — Taras P Bemko (74) *Attorney, Agent, or Firm* — Cantor Colburn LLP (57) ABSTRACT

An apparatus for detecting a position of a moveable component of a valve disposed in a borehole penetrating the earth includes a radioactive marker disposed on the moveable component and a radiation detector configured to detect radiation emitted by the radioactive marker. The apparatus also includes a controller configured to receive radiation detection information from the radiation detector and to correlate the radiation detection information to the position of the moveable component.

19 Claims, 7 Drawing Sheets

DOWNHOLE VALVE POSITION MONITOR

BACKGROUND

A Surface Controlled Subsurface Safety Valve (SCSSV) is a valve that is disposed in subsurface production tubing that is used to extract hydrocarbons such as oil or gas from formation reservoirs. The SCSSV is controlled from a control panel at the earth's surface and is designed to stop the flow of downhole fluids if an unwanted condition occurs that may damage equipment. Typically, the SCSSV will have a moving part that allows the flow to occur or to stop the flow based on the position of the moving part. Unfortunately, extreme downhole conditions due such as to heavyweight mud, cement, or heavy debris build-up may sometimes cause an SCSSV to require maintenance. Hence, innovations that enable detection of a position of the moving part to aid in troubleshooting or preventive maintenance of the SCSSV would be well received in the hydrocarbon production industry.

SUMMARY

Disclosed is an apparatus for detecting a position of a moveable component of a valve disposed in a borehole penetrating the earth. The apparatus includes: a radioactive marker disposed on the moveable component; a radiation detector configured to detect radiation emitted by the radioactive marker; and a controller configured to receive radiation detection information from the radiation detector and to correlate the radiation detection information to the position of the moveable component.

Also disclosed is a method for detecting a position of a moveable component of a valve disposed in a borehole penetrating the earth. The method includes: emitting radiation from a radioactive marker disposed on the moveable component of the valve; detecting the radiation emitted by the radioactive marker using a radiation detector; and correlating at least one of detected radiation and non-detected radiation with the position of the moveable component using a controller.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and no limitation with reference to the Figures.

Disclosed are apparatuses and methods for detecting a position of a moveable component in a valve (i.e., a downhole valve) disposed in a borehole penetrating the earth. A position detection system uses one or more tags or markers having a radioactive substance that are secured to the moveable component. A radiation detector that can detect radiation emitted by the radioactive substance provides a signal indicating that radiation is detected when in a certain range of the radioactive tag or marker. Once radiation is detected, the position of the moveable component can be correlated to a known position of the radiation detector. The radiation detector can be fixed to the valve or it can be secured to a tool that can be conveyed to the valve. Various embodiments of the position detection system are contemplated and discussed further below.

Figure 1:
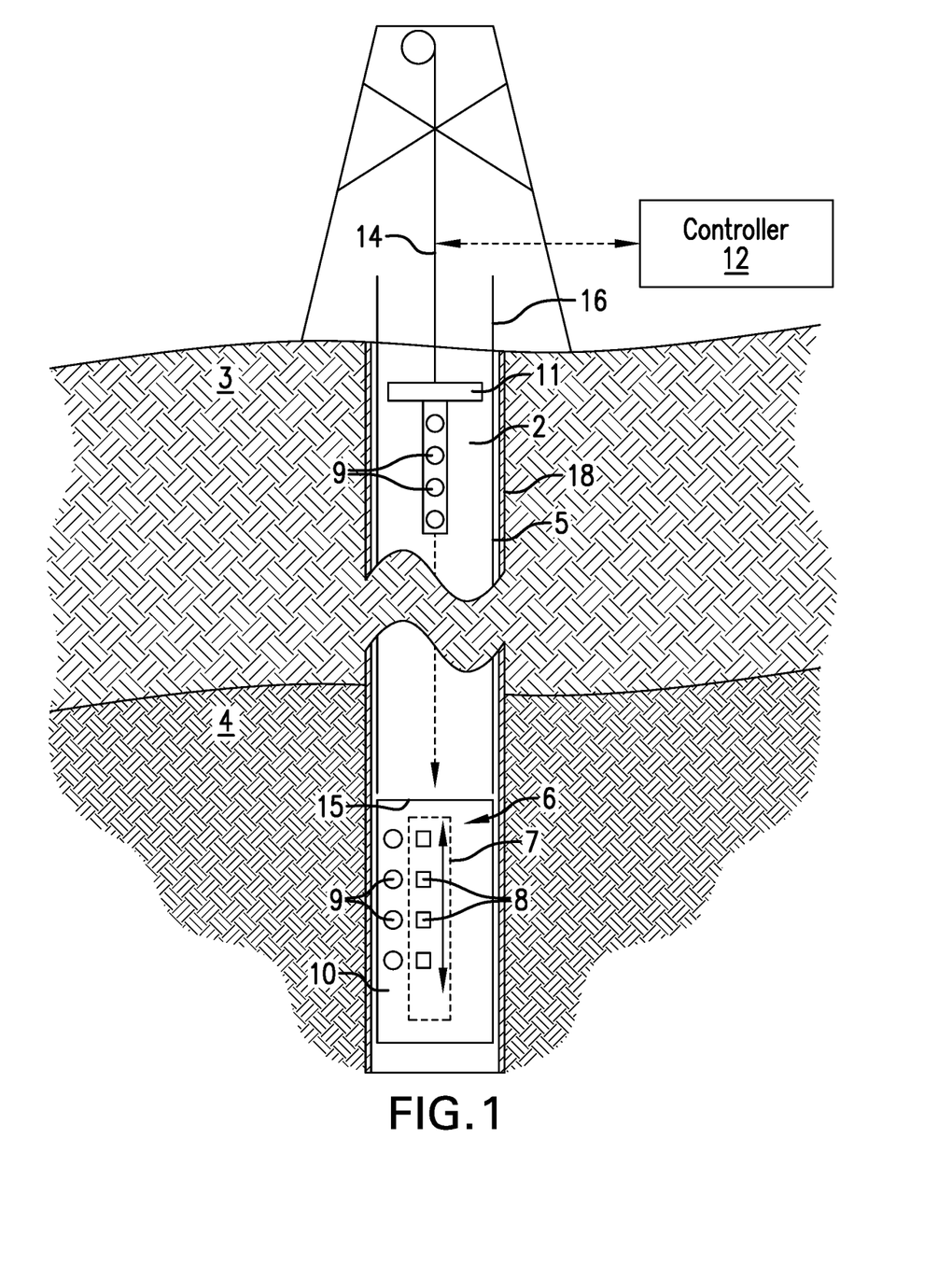
FIG. 1 illustrates a cross-sectional view of production tubing having a surface controlled safety valve (SCSSV) disposed in a borehole penetrating the earth.

FIG. 1 is illustrates a cross-sectional view of production tubing 5 disposed in a borehole 2 penetrating the earth 3 having a hydrocarbon bearing formation 4. A casing 18 may line the borehole 2. In one or more embodiments, the production tubing 5 is a string of production pipes. The production tubing 5 includes a valve 6 having a moveable component 7. In general, a position of the moveable component 7 corresponds to a flow state or position of the valve 6 such as the valve 6 enables full flow, enables no flow, or enables some intermediate flow between full flow and no flow. One or more radioactive markers 8 are secured to the moveable component 7. In one or more embodiments, the one or more radioactive markers 8 include a material known in the art that emits gamma-ray radiation. One or more radiation detectors 9 are disposed on a body 10 of the valve 6 such that the radiation detectors 9 can detect the radiation emitted by the radioactive markers 8 when the detectors 9 are within a certain range of the markers 8. Alternatively, the one or more radiation detectors 9 may be disposed on a downhole tool 11 that conveyable through the production tubing 5. A carrier such as a communication cable 14 supports the downhole tool 11 and can communicate radiation detection information to the surface of the earth. Non-limiting embodiments of the radiation detectors 9 include scintillation-type detectors, Geiger counters, or other types of known detection devices. In one or more embodiments, the tool 11 is configured to land on a "no-go profile" 15 of the valve 6. The no-go profile 15 coordinates with the tool 11 to prevent a top portion of the tool 11 from proceeding further into the valve 16. The no-go profile 15 has a fixed known position with respect to the location of the one or more radiation detectors 9 from which a position of the moveable component 7 can be correlated to in order to determine the state of the valve 6. A controller 12, which may be disposed at the surface of the earth 3 or downhole, is configured to receive detection information from the one or more radiation detectors 9, such as by the communication cable 14, and to determine a state (i.e., open, closed, or intermediate) of the valve 6 using the detection information. The position of the moveable component 7 and/or state of the downhole valve 6 may be indicated by video display, a liquid crystal display (LCD) indicator, or indicator lights in one or more non-limiting embodiments. In a marine application involving an ocean platform, a riser 16 may extend from the top of the borehole 2 to the ocean platform at the ocean surface. Hence, reference to a valve disposed in a borehole is intended to be inclusive of a valve disposed in a riser that extends the borehole to the ocean platform.

Figure 2A:
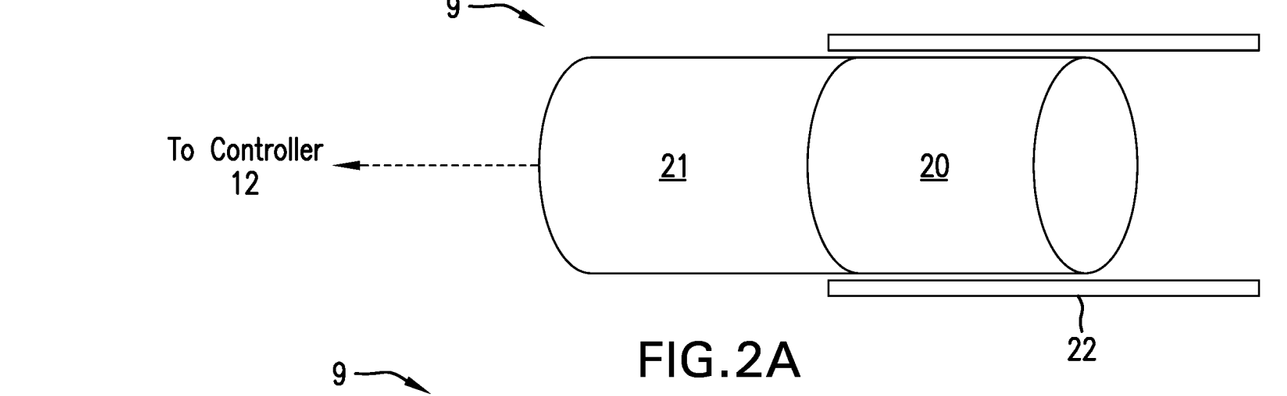
FIGS. 2A and 2B depict aspects of an embodiment of the SCSSV.
Figure 2B:
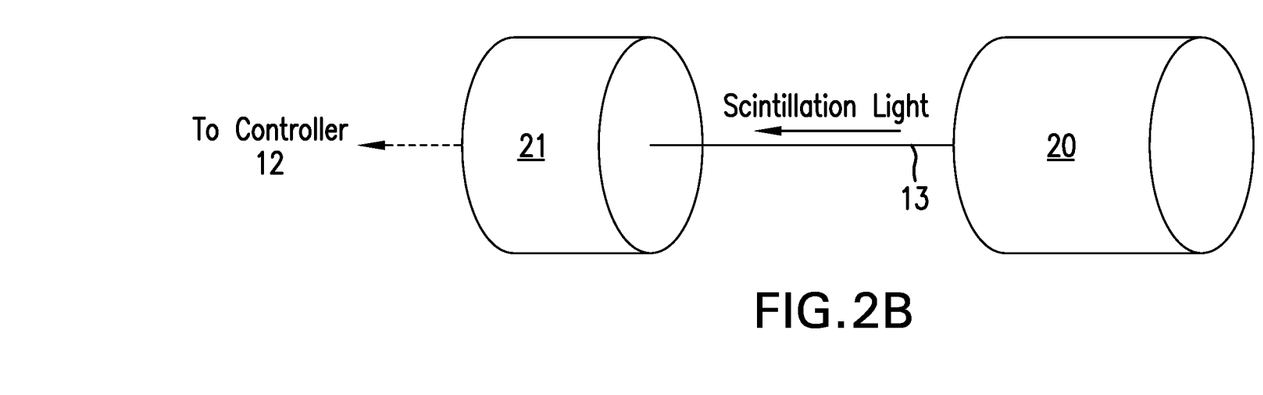

FIGS. 2A and 2B depict aspects of one of the radiation detectors 9. A scintillator 20 is configured to receive gamma-ray radiation and scintillate to generate light by the interaction of the gamma-ray radiation and the scintillator 20. In the embodiment of FIG. 2A, a photo-detector 21, such as a photo-multiplier tube, is attached to the scintillator 20 and receives the light generated by scintillation to generate a corresponding electrical signal that is transmitted to the controller 12. In general, the electrical signal provides detection information related to the amount of radiation detected. In the embodiment of FIG. 2B, the light generated by scintillation is transmitted to the photo-detector 21 at the surface or at some downhole location away from the scintillator 20 via fiber optic line 13. An advantage of the fiber optic line 13 is that it is rugged for surviving the harsh downhole environment and immune to electromagnetic interference. Optionally, a shield 22 to block radiation may be used to surround or partially surround the scintillator 20 to enable the scintillator 20 to detect radiation when the radioactive marker 8 is within a selected or predefined range of the scintillator 20 in order to provide a precise indication of the position of the radioactive marker 8. In one or more embodiments, the shield 22 shields the associated radiation detector 9 to prevent or limit the detection of radiation at an undesired angle.

Figure 3:
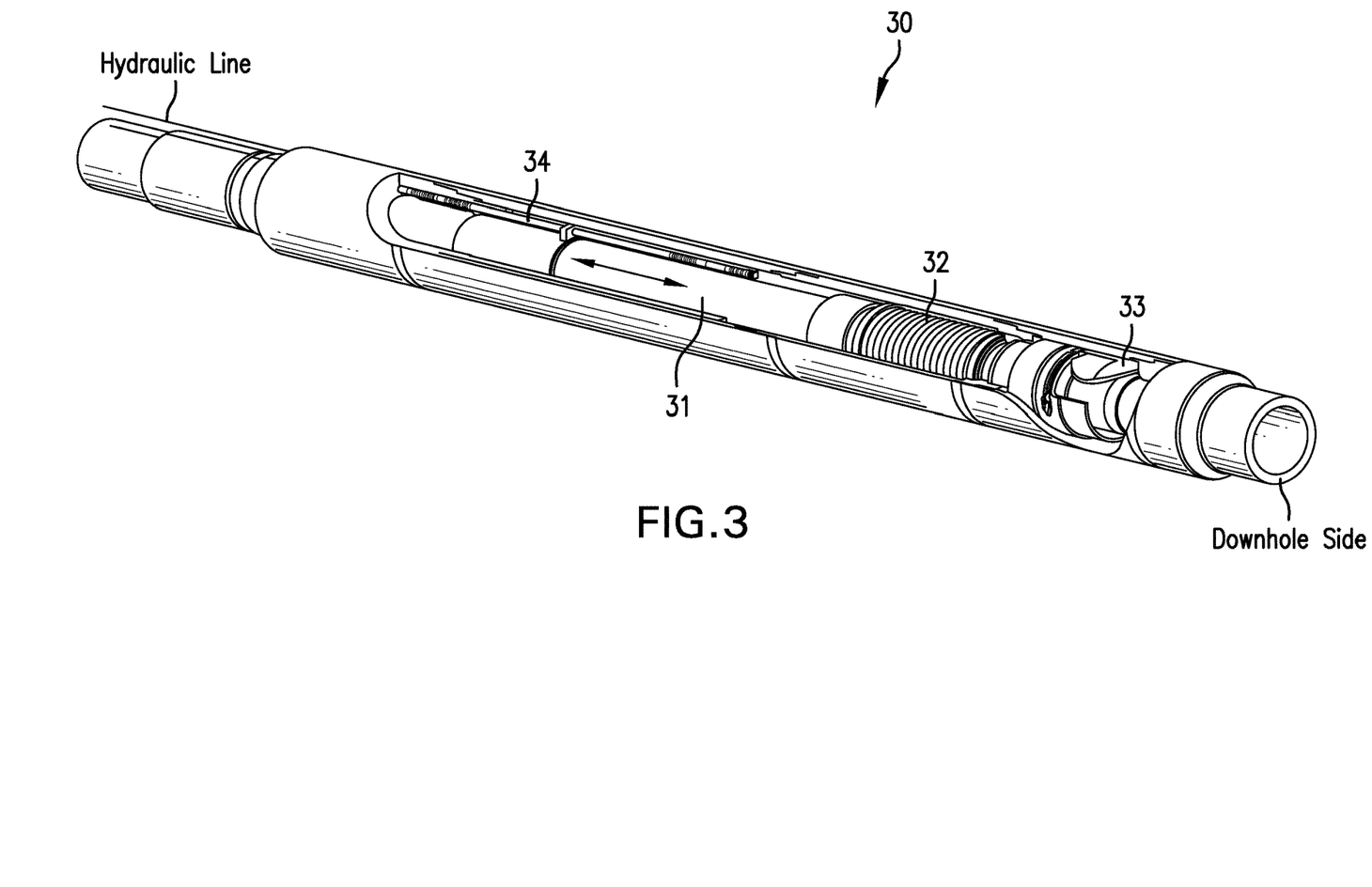
FIG. 3 depicts aspects of a position detection system for detecting a position of a moveable flow tube in the SCSSV.

FIG. 3 depicts aspects of the valve 6 configured as a surface controlled subsurface safety valve (SCSSV) 30. The SCSSV 30 includes a moveable flow tube 31. By moving downward, the flow tube 31 pushes against a power spring 32 and engages and pushes a flapper 33 to open thereby causing the SCSSV 30 to allow flow through the SCSSV 30. An operating piston 34 is coupled to the flow tube 31 and is configured to push the flow tube 31 against the power spring 32. In one or more embodiments, the operating piston 34 is operated or actuated by hydraulic pressure controlled at the surface of the earth 3. By releasing or reducing the hydraulic pressure, the power spring 32 will push the flow tube 31 away from the flapper 33 causing the flapper to close thereby stopping flow through the SCSSV 30.

Figure 4A:
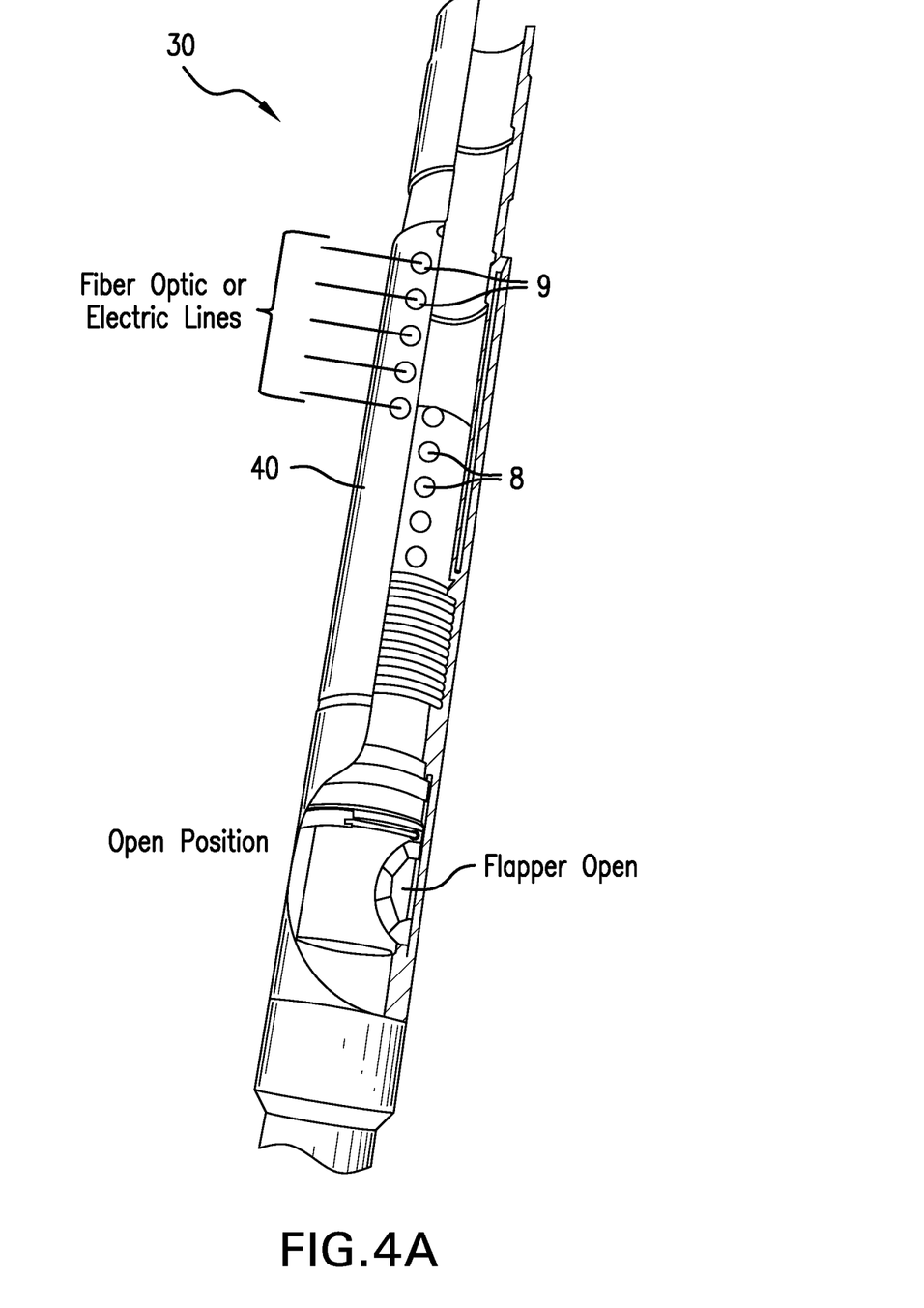
FIGS. 4A and 4B, collectively referred to as FIG. 4, depict aspects of various embodiments for detecting a position of the moveable flow tube in the SCSSV.
Figure 4B:
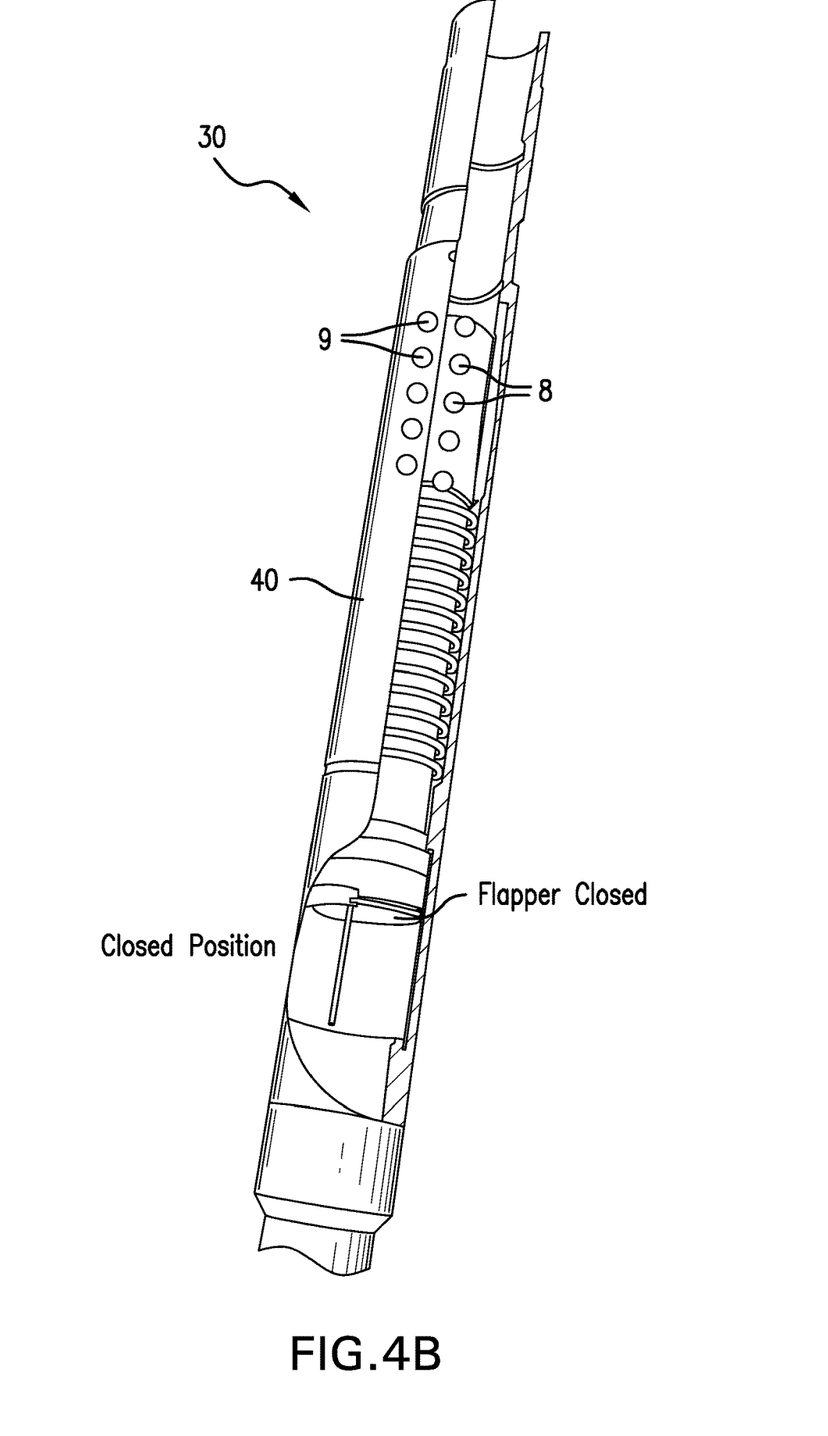

FIG. 4 depicts aspects of the SCSSV 30 having radioactive markers 8 disposed on the flow tube 31 and a corresponding number of radiation detectors 9 disposed on a body 40 of the SCSSV 30. In FIG. 4A, the SCSSV is shown in a closed position, while in FIG. 4B the SCSSV 30 is shown in the open position. As can be seen in FIG. 4, each of the radiation detectors 9 will detect radiation from the corresponding radioactive marker 8 when the SCSSV 30 is in the closed position, while not all of the radiation detectors 9 will detect radiation when the SCSSV 30 is in the open position. Also, an intermediate position of the SCSSV 30 can be derived from the number of radiation detectors that detect radiation. In an alternative embodiment, one radioactive marker 8 may be disposed on the flow tube 31 and one radiation detector 9 may be disposed on the body 40. The single radioactive marker 8 and single radiation detector 9 configuration may provide a binary signal related to position (i.e., open or closed). Alternatively, the single radioactive marker 8 and single radiation detector 9 configuration may provide an indication of an intermediate position derived from a radiation intensity measured by the single radiation detector 9.

Figure 5:
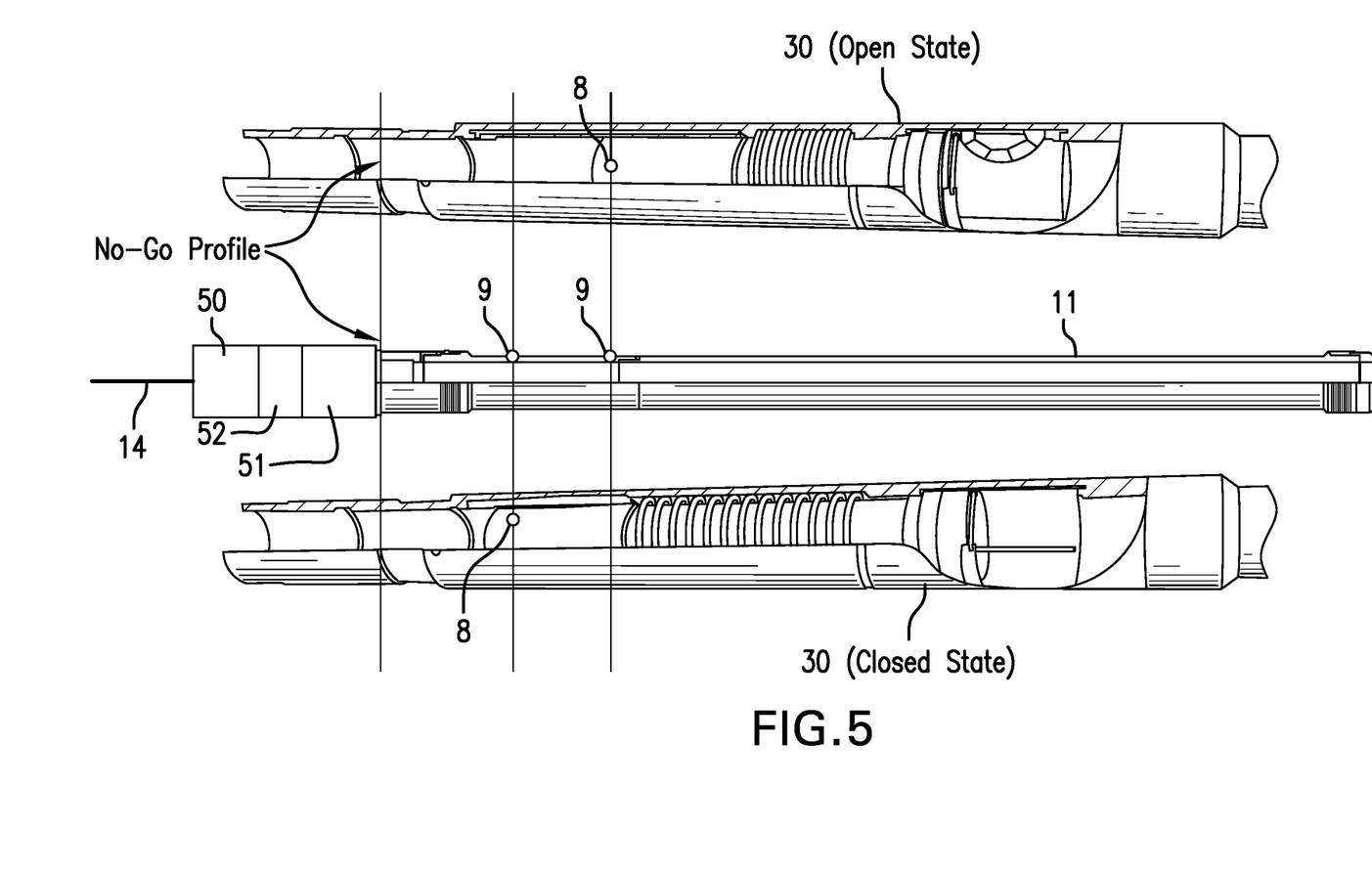
FIG. 5 depicts aspects of a conveyable detection tool for detecting the position of the moveable flow tube in the SCSSV.

FIG. 5 depicts aspects of various configurations for detecting positions of the flow tube 31. In the embodiment of FIG. 5, a single radioactive marker 8 is disposed on the flow tube 31, while two radiation detectors 9 are disposed on the downhole tool 11 that is configured to land on the SCSSV 30. Depending on which of the two radiation detectors 9 detect radiation, the position of the flow tube 31 can be determined. In one or more embodiments, the downhole tool 11 includes downhole electronics 50 configured to operate the radiation detectors 9 and process and/or store radiation detection information obtained by the radiation detectors 9. As such, the downhole electronics 50 may perform one or more functions of the controller 12. The communication cable 14 may provide communications between the downhole electronics 50 and the controller 12. Non-limiting embodiments of the communication cable 14 include a slickline, an electric line, and/or a fiber optic line.

The downhole tool 11 may also include an actuator 51 configured to engage with and move or exercise the flow tube 31 (or moveable component 7). In one or more embodiments, the actuator 51 is an electrical linear actuator that may be electrically powered from the surface of the earth such as by the communications cable 14. The downhole tool 11 may also include a force sensor 52 configured to measure a force exerted by actuator 51. Force measurements may be transmitted to the surface to the controller 12, which may be configured to generate a force-moveable component position curve. This curve can show that the required force to exercise the flow tube 31 or moveable component is increasing, decreasing or staying the same indicating that the exercising is potentially galling it, freeing it, or is doing nothing to damage it. If the downhole tool 11 is run when the valve 6 is first installed, a baseline force-displacement curve can be generated. Future curves can then be compared to this initial curve to indicate if valve performance was deteriorating due to well conditions. If the curve shifts upwards (indicating higher forces were required to move the flow tube), then this could indicate the presence of debris or increased debris in the spring cavity. This can provide early detection and prevention of valve failures, such as through an integral chemical injection port either in the valve or the downhole tool.

Figure 6:
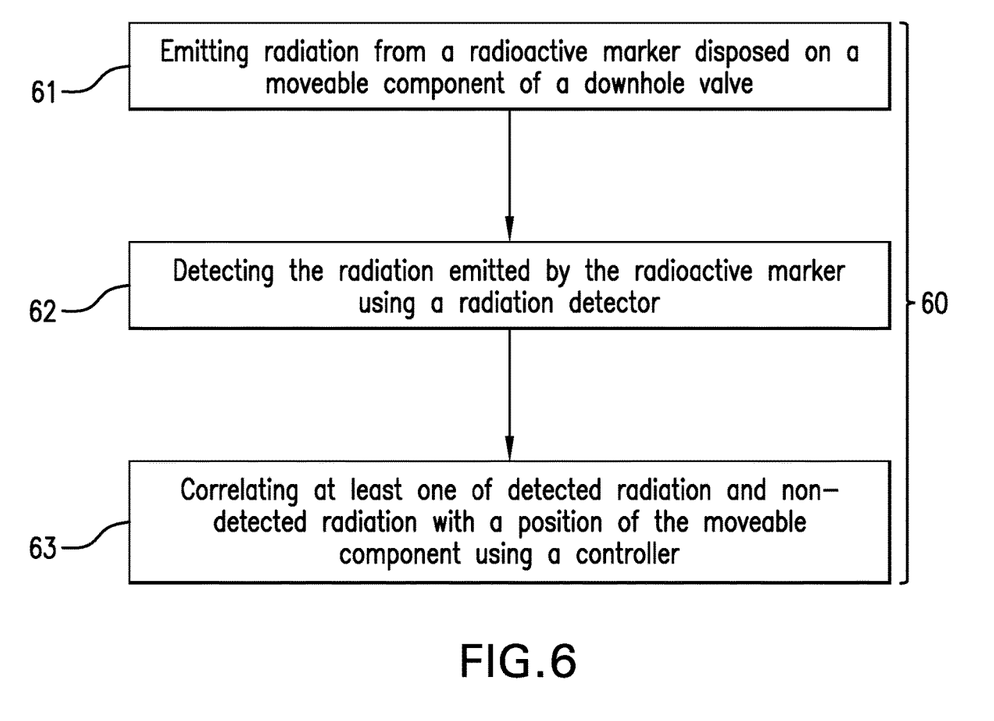
FIG. 6 is a flow chart for a method for detecting a position of a moveable component of a downhole valve.

FIG. 6 is a flow chart for a method 60 for detecting a position of a moveable component of a downhole valve. Block 61 calls for emitting radiation from a radioactive marker disposed on the moveable component of the downhole valve. Block 62 calls for detecting the radiation emitted by the radioactive marker using a radiation detector. Block 63 calls for correlating at least one of detected radiation and non-detected radiation with the position of the moveable component using a controller. Non-detected radiation relates to the radiation detector not detecting radiation and, thus, providing an indication that the radioactive marker is not within a certain range of the radiation detector. Hence, the position of the moveable component at the marker location is not within that certain range.

The method 60 may also include correlating the position of the moveable component with a state of the downhole valve. Embodiments of the state of the downhole valve include open, closed, and/or an intermediate state between open and closed. For example, in the embodiment where the downhole valve is a SCSSV, a full downward position (i.e., deeper into the borehole) of the moveable flow tube can be correlated to the SCSSV being open, while a full upward position (i.e., towards the surface) can be correlated to the SCSSV being closed.

The method 60 may also include exercising the downhole valve using an actuator disposed on the downhole tool and indicating a position of the moveable component or state of the downhole valve during the exercising. The method 60 may also include measuring a force applied by the actuator to move the moveable component. The method 60 may also include generating a force-displacement curve for the moveable component. The method 60 may also include performing remedial actions, such as injecting fluid, if a force on the force-displacement curve exceeds a threshold value indicating a potential problem. The method 60 may also include landing the downhole tool on the no-go profile.

It can be appreciated that certain physical actions may be performed depending on the indicated state of the downhole valve 6. For example, if the state of the downhole valve 6 indicates a malfunction of the valve 6 (e.g., valve is open when it should be closed), then remedial action to repair or replace the valve 6 may be undertaken. In another example, once the valve 6 is indicated to be in a certain state, a further process action may be implemented such as fluid extraction with the valve indicated as being open. The further process action may be implemented automatically by a controller such as the controller 12 or manually by an operator based on the indicated state of the valve 6.

The apparatuses and methods disclosed herein provide several advantages. One advantage is the ability to have real-time detection of the position of the moveable component in the valve and indication of the position at the surface to a user. Another advantage is that the apparatuses and methods are useful for troubleshooting activities, early detection of failures or impending failures, and prevention or correction of problems.

Set forth below are some embodiments of the foregoing disclosure:

Embodiment 1: An apparatus for detecting a position of a moveable component of a valve disposed in a borehole penetrating the earth, the apparatus comprising: a radioactive marker disposed on the moveable component, a radiation detector configured to detect radiation emitted by the radioactive marker; and a controller configured to receive radiation detection information from the radiation detector and to correlate the radiation detection information to the position of the moveable component.

Embodiment 2: The apparatus according to any previous embodiment, further comprising correlating the position of the moveable component to a state of the valve.

Embodiment 3: The apparatus according to any previous embodiment wherein the state of the valve comprises at least one of open, closed, and intermediate between open and closed.

Embodiment 4: The apparatus according to any previous embodiment wherein the valve is a subsurface safety valve (SSV) comprising a flapper to open or close flow through the valve and the moveable component comprises a moveable flow tube that moves internal to the SSV to open or close the flapper.

Embodiment 5: The apparatus according to any previous embodiment wherein the SSV is a surface controlled subsurface safety valve (SCSSV).

Embodiment 6: The apparatus according to any previous embodiment wherein the radiation detector is disposed on a tool configured to be lowered into the borehole and land on the valve at a predefined reference location.

Embodiment 7: The apparatus according to any previous embodiment wherein the tool comprises and an actuator configured to exercise the moveable component.

Embodiment 8: The apparatus according to any previous embodiment wherein the actuator is a linear electrically operated actuator.

Embodiment 9: The apparatus according to any previous embodiment wherein the tool comprises a force sensor configured to sense a force applied by the actuator.

Embodiment 10: The apparatus according to any previous embodiment wherein the controller is further configured to operate the actuator and record the force sensed by the force sensor.

Embodiment 11: The apparatus according to any previous embodiment wherein the radiation detector comprises a scintillator that scintillates to generate light upon interacting with received radiation and a photo-detector optically coupled to the scintillator.

Embodiment 12: The apparatus according to any previous embodiment wherein the photo-detector for the radiation detector is disposed at the surface of the earth and coupled to the corresponding scintillator by a fiber optic line.

Embodiment 13: The apparatus according to any previous embodiment wherein the photo-detector for the radiation detector is attached to the scintillator.

Embodiment 14: The apparatus according to any previous embodiment wherein the controller is disposed at the surface of the earth and apparatus further comprises at least one of an electric line, a slickline, and a fiber optic line coupling the radiation detector to the controller.

Embodiment 15: The apparatus according to any previous embodiment further comprising shielding to shield the radiation detector from radiation at an undesired angle.

Embodiment 16: The apparatus according to any previous embodiment wherein the radiation comprises gamma-rays.

Embodiment 17: A method for detecting a position of a moveable component of a valve disposed in a borehole penetrating the earth, the method comprising: emitting radiation from a radioactive marker disposed on the moveable component of the valve, detecting the radiation emitted by the radioactive marker using a radiation detector, and correlating at least one of detected radiation and non-detected radiation with the position of the moveable component using a controller.

Embodiment 18: The method according to any previous embodiment wherein the radiation detector comprises a scintillator and the method further comprises transmitting an optical signal from the scintillator to a corresponding photo-detector using a fiber optic line.

Embodiment 19: The method according to any previous embodiment wherein the radiation detector comprises a scintillator attached to a photo-detector and the method further comprises transmitting an electrical signal the each photo-detector to the controller using at least one of an electric line and a slickline.

Embodiment 20: The method according to any previous embodiment further comprising landing a downhole tool comprising the one or more radiation detectors on the valve in the borehole.

Embodiment 21: The method according to any previous embodiment further comprising exercising the moveable component using an actuator disposed on the downhole tool and recording a force used to exercise the moveable component as measured by a force sensor.

In support of the teachings herein, various analysis components may be used, including a digital and/or an analog system. For example, the controller 12, and/or downhole electronics 50 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The communication cable 14 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An apparatus for detecting a position of a moveable component of a valve disposed in a borehole penetrating the earth, the apparatus comprising:
   a radioactive marker secured to the moveable component;
   a radiation detector configured to detect radiation emitted by the radioactive marker, wherein the radiation detector is disposed on a downhole tool configured to be lowered into the borehole and land on the valve at a predefined reference location; and
   a controller configured to receive radiation detection information from the radiation detector and to correlate the radiation detection information to the position of the moveable component.

2. The apparatus according to claim 1, further comprising correlating the position of the moveable component to a state of the valve.

3. The apparatus according to claim 2, wherein the state of the valve comprises at least one of open, closed, and intermediate between open and closed.

4. The apparatus according to claim 1, wherein the valve is a subsurface safety valve (SSV) comprising a flapper to open or close flow through the valve and the moveable component comprises a moveable flow tube that moves internal to the SSV to open or close the flapper.

5. The apparatus according to claim 4, wherein the SSV is a surface controlled subsurface safety valve (SCSSV).

6. The apparatus according to claim 1, wherein the downhole tool comprises an actuator configured to exercise the moveable component.

7. The apparatus according to claim 6, wherein the actuator is a linear electrically operated actuator.

8. The apparatus according to claim 6, wherein the downhole tool comprises a force sensor configured to sense a force applied by the actuator.

9. The apparatus according to claim 8, wherein the controller is further configured to operate the actuator and record the force sensed by the force sensor.

10. The apparatus according to claim 1, wherein the radiation detector comprises a scintillator that scintillates to generate light upon interacting with received radiation and a photo-detector optically coupled to the scintillator.

11. The apparatus according to claim 10, wherein the photo-detector for the radiation detector is disposed at the surface of the earth and coupled to the corresponding scintillator by a fiber optic line.

12. The apparatus according to claim 10, wherein the photo-detector for the radiation detector is attached to the scintillator.

13. The apparatus according to claim 1, wherein the controller is disposed at the surface of the earth and apparatus further comprises at least one of an electric line, a slickline, and a fiber optic line coupling the radiation detector to the controller.

14. The apparatus according to claim 10, further comprising shielding to shield the radiation detector from radiation at an undesired angle.

15. The apparatus according to claim 1, wherein the radiation comprises gamma-rays.

16. A method for detecting a position of a moveable component of a valve disposed in a borehole penetrating the earth, the method comprising:
- landing a downhole tool on the valve;
- emitting radiation from a radioactive marker secured to the moveable component of the valve;
- detecting the radiation emitted by the radioactive marker using a radiation detector disposed on the downhole tool; and
- correlating at least one of detected radiation and non-detected radiation with the position of the moveable component using a controller.

17. The method according to claim 16, wherein the radiation detector comprises a scintillator and the method further comprises transmitting an optical signal from the scintillator to a corresponding photo-detector using a fiber optic line.

18. The method according to claim 16, wherein the radiation detector comprises a scintillator attached to a photo-detector and the method further comprises transmitting an electrical signal from each photo-detector to the controller using at least one of an electric line and a slickline.

19. The method according to claim 16, further comprising exercising the moveable component using an actuator disposed on the downhole tool and recording a force used to exercise the moveable component as measured by a force sensor.

* * * * *